C. SCHIFFERLY.
Nut-Lock.

No. 216,222.  Patented June 3, 1879.

WITNESSES:
O. Clarence Poole
Rich'd K. Evans.

INVENTOR:
Conrad Schifferly
by A. H. Evans & Co
atty

UNITED STATES PATENT OFFICE.

CONRAD SCHIFFERLY, OF NORTH MANCHESTER, INDIANA, ASSIGNOR OF ONE-HALF HIS RIGHT TO CHRISTIAN SHIVELY, OF SAME PLACE.

IMPROVEMENT IN NUT-LOCKS.

Specification forming part of Letters Patent No. 216,222, dated June 3, 1879; application filed February 4, 1878.

*To all whom it may concern:*

Be it known that I, CONRAD SCHIFFERLY, of North Manchester, county of Wabash, and State of Indiana, have invented certain new and useful Improvements in Nut-Locks, of which the following is a clear, full, and exact description, reference being had to the accompanying drawings, making a part of this specification, in which—

Figure 1:
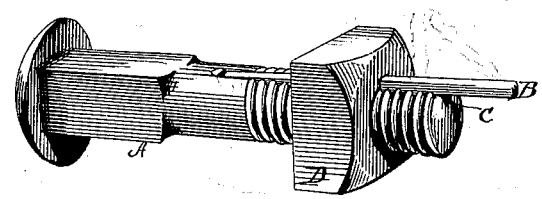
Figure 2:
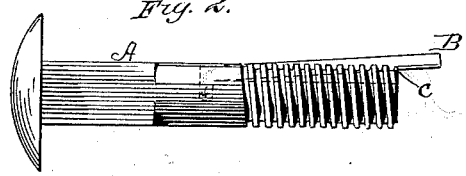
Figure 3:
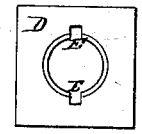

Figure 1 is a perspective view of the bolt and nut with my nut-locking device attached. Fig. 2 is a side elevation of the bolt. Fig. 3 is a front view of the nut.

My invention relates to improvements in devices for locking nuts on bolts, so that the nut cannot work off the bolt on account of jolting or jarring and other causes; and it consists in a bolt provided with a longitudinal spring lying in a slot and a nut having grooves or recesses.

To enable others skilled in the art to make and use my invention, I will proceed to describe the exact manner in which I have carried it out.

In the drawings, A represents a bolt provided with a spring, B, inserted in the end of a groove, C, which runs the length of the thread on the bolt. The nut D is provided with grooves E, into which the spring on the bolt catches or locks, thus securing the nut. The spring B should, for convenience, project slightly beyond the end of the bolt.

The operation of my device is as follows: To place the nut on the bolt, press the spring down into the slot in the bolt and screw the nut on as far as desired. Then, to lock the nut, let the spring go, taking care to have one of the grooves in the nut opposite, when it will engage in the slot in the nut.

It will be observed that though the nut is rigidly locked it is easily removable without cutting or injuring the bolt.

Having thus described my invention, what I claim as new, and desire to secure by Letters Patent, is—

The longitudinally-slotted screw-threaded bolt A, provided with the spring B, fitting in the slot, in combination with the screw-nut D, provided with the slots E E, substantially as and for the purpose set forth.

CONRAD SCHIFFERLY.

Witnesses:
JACOB CARTER,
W. T. MENDENHALL.